(12) United States Patent
Ikeda (10) Patent No.: US 12,031,625 B2
(45) Date of Patent: Jul. 9, 2024

(54) MECHANICAL DEVICE HAVING WORM GEAR MECHANISM

(71) Applicant: TSUDAKOMA KOGYO KABUSHIKI KAISHA, Ishikawa-ken (JP)

(72) Inventor: Yohei Ikeda, Ishikawa-ken (JP)

(73) Assignee: TSUDAKOMA KOGYO KABUSHIKI KAISHA, Ishikawa-Ken (JP)

( * ) Notice: Subject to any disclaimer, the term of this patent is extended or adjusted under 35 U.S.C. 154(b) by 0 days.

(21) Appl. No.: 17/872,523

(22) Filed: Jul. 25, 2022

(65) Prior Publication Data

US 2023/0057031 A1 Feb. 23, 2023

(30) Foreign Application Priority Data

Aug. 18, 2021 (JP) .................................. 2021-133072

(51) Int. Cl.
*F16H 57/12* (2006.01)
*F16H 19/08* (2006.01)

(52) U.S. Cl.
CPC ............. *F16H 57/12* (2013.01); *F16H 19/08* (2013.01)

(58) Field of Classification Search
CPC .... F16H 57/12; F16H 55/24; F16H 2057/125; F16H 19/08
USPC ................................................ 74/89.14, 409
See application file for complete search history.

(56) References Cited

U.S. PATENT DOCUMENTS

| 1,778,258 | A | | 10/1930 | Jennings | |
|---|---|---|---|---|---|
| 4,261,218 | A | | 4/1981 | Eagan, Sr. | |
| 5,186,068 | A | * | 2/1993 | Heller | F16H 1/16 74/401 |
| 6,386,059 | B1 | * | 5/2002 | Mittendorf, Jr. | F16H 55/24 74/400 |

FOREIGN PATENT DOCUMENTS

| CN | 102384220 | A | * | 3/2012 | |
|---|---|---|---|---|---|
| CN | 103089971 | A | * | 5/2013 | |
| CN | 104002199 | A | * | 8/2014 | ............. B23Q 23/00 |
| CN | 203918648 | U | * | 11/2014 | |

(Continued)

OTHER PUBLICATIONS

Dec. 20, 2022, European Search Report issued for related EP Application No. 22186981.1.

*Primary Examiner* — T. Scott Fix
(74) *Attorney, Agent, or Firm* — Paratus Law Group, PLLC (57) ABSTRACT

A mechanical device includes a worm gear mechanism which includes a worm wheel and a worm shaft. The worm gear mechanism adjusts backlash between the worm and the worm wheel by movement of the worm shaft in an axis line direction. The mechanical device includes a position adjusting mechanism which includes a holder, an axial force generation part and a base part. The holder is screwed into the accommodation hole and rotatably supports the worm shaft. The holder causes the movement of the worm shaft by rotation. The axial force generation part includes a screw part and exerts an axial force on the holder. The base part is provided to the frame and receives a reactive force acting on the axial force generation part as a result of exerting the axial force to the holder.

4 Claims, 6 Drawing Sheets

(56) References Cited

FOREIGN PATENT DOCUMENTS

| | | | | | |
|---|---|---|---|---|---|
| CN | 107461480 | A | * | 12/2017 | ........... F16H 57/022 |
| CN | 109780171 | A | * | 5/2019 | |
| CN | 109780186 | A | * | 5/2019 | |
| CN | 111536915 | A | | 8/2020 | |
| CN | 111536915 | B | * | 2/2022 | ............. G01B 21/00 |
| JP | H02-014921 | Y2 | | 4/1990 | |

* cited by examiner

MECHANICAL DEVICE HAVING WORM GEAR MECHANISM

CROSS-REFERENCE TO RELATED APPLICATION(S)

This application is based on and claims priority under 35 USC 119 from Japanese Patent Application No. 2021-133072 filed on Aug. 18, 2021, the contents of which are incorporated herein by reference.

TECHNICAL FIELD

The present invention relates to a mechanical device having a worm gear mechanism, which includes a worm wheel attached to a rotary shaft and a worm shaft including a worm in mesh with the worm wheel and provided in an accommodation hole of a frame, and the worm gear mechanism is configured to adjust backlash between the worm and the worm wheel by movement of the worm shaft in an axis line direction.

BACKGROUND ART

Examples of the mechanical device having the worm gear mechanism as described above include a rotation indexing device disclosed in PTL 1, for example. The rotation indexing device includes an index shaft (rotary shaft) rotatably supported in a frame via a bearing, and a worm gear mechanism constituted by a worm wheel attached to the rotary shaft and a worm shaft including a worm in mesh with the worm wheel. Note that, the worm shaft is accommodated in an accommodation hole formed in the frame (more specifically, in a worm bracket forming a part of the frame). Further, the worm shaft is rotatably supported with respect to the frame via a receiving stand (holder) provided in a form of being fitted in the accommodation hole on one end side of the accommodation hole and a bearing embedded in the receiving stand.

In addition, PTL 1 discloses that in the rotation indexing device, the worm gear mechanism can be configured so that the worm shaft can be advanced and retreated (slid) in the axis line direction and the backlash between the worm and the worm wheel is adjusted by the advance and retreat. Further, PTL 1 discloses that the worm shaft is advanced and retreated in the axis line direction by advancing and retreating the holder, which supports the worm shaft, in a screw manner with respect to the frame (worm bracket).

CITATION LIST

Patent Literature

PTL 1: JPH02-014921Y2

In such a rotation indexing device of PTL 1, when the holder is configured to be able to be advanced and retreated in a screw manner with respect to the frame, a configuration is adopted in which a male screw is formed on an outer peripheral surface of the holder, a female screw is formed on an inner peripheral surface on the one end-side of the accommodation hole and the holder is provided in a state of being screwed (screw-fitted) in the accommodation hole. With such a configuration, the rotation of the holder advances and retreats (advanced and retreats in a screw manner) the holder itself in the axis line direction with respect to the frame, whereby the worm shaft is advanced and retreated as described above.

In the meantime, the backlash is adjusted by rotating the holder as described above and moving the worm shaft in a direction corresponding to the adjustment. In addition, after the adjustment is completed, it is necessary to fix the holder so as not to be rotatable with respect to the frame so that an amount of the adjusted backlash does not change.

Note that, as a mechanism for fixing a rotary body to be rotated such as a holder so as not to be rotatable, a fixing mechanism configured to press a disk-shaped spacer (set piece) against an outer peripheral portion of the rotary body by a screw mechanism using a screw member is generally used well. According to such a fixing mechanism, the rotary body is fixed so as not to be rotatable by a frictional force acting between the set piece subjected to the pressing force by the screw mechanism and the portion of the outer peripheral surface of the rotary body to which the set piece is pressed.

However, according to such a fixing mechanism, the frictional force acting on the rotary body as a force for preventing the rotation of the rotary body is applied to only the portion of the outer peripheral surface of the rotary body with which the set piece is in contact, i.e., only a portion of the outer peripheral surface of the rotary body in a circumferential direction. For this reason, when such a fixing mechanism is adopted in the rotation indexing device, there is a problem that the rotation of the holder cannot be securely prevented.

More specifically, the rotation indexing device is configured to place thereon a workpiece and is used for machining the workpiece. When machining the workpiece, large vibration acts on the rotary shaft via the workpiece along with the machining. In addition, as the vibration acts on the rotary shaft in this way, the vibration also acts on the holder, which supports the worm shaft via the bearing, via the worm wheel attached to the rotary shaft and the worm shaft in mesh with the worm wheel. When the vibration acts on the holder in this way, a force (rotational force) in a rotation direction of the holder is generated in the holder and the force acts on the holder. Further, a magnitude of the force depends on a magnitude of the vibration.

In this case, in the rotation indexing device adopting the fixing mechanism as described above, the fixing mechanism can exert the frictional force, which is the force for preventing the rotation of the holder as described above, on only a portion of the outer peripheral surface of the holder in the circumferential direction. Therefore, if the large vibration generated in machining the workpiece acts, the rotational force generated by the vibration may exceed the frictional force. When the rotational force exceeds the frictional force in this way, the holder rotates, and as a result, the worm shaft moves in the axis line direction, so that the amount of the adjusted backlash changes.

Like this, in the fixing mechanism using the set piece and the screw mechanism described above, depending on the mechanical device adopted, the rotational force may exceed the frictional force due to vibration or the like generated in the mechanical device, and therefore, the fixing mechanism may not be sufficient as a mechanism to prevent the rotation of the holder so that the amount of the adjusted backlash does not change.

SUMMARY

Therefore, an object of the present invention is to provide, for a mechanical device having a worm gear mechanism configured so that backlash is adjusted by rotation of a holder, a configuration capable of more securely fixing the holder to a frame after the backlash is adjusted.

A preamble of the present invention is a mechanical device having a worm gear mechanism including: a worm wheel attached to a rotary shaft; and a worm shaft including a worm in mesh with the worm wheel and provided in an accommodation hole of a frame, and the worm gear mechanism configured to adjust backlash between the worm and the worm wheel by movement of the worm shaft in an axis line direction.

In addition, the mechanical device having a worm gear mechanism that is the preamble of the present invention, the mechanical device including a position adjusting mechanism, the position adjusting mechanism including: a holder screwed into the accommodation hole on one end-side of the accommodation hole, the holder configured to rotatably support the worm shaft, the holder configured to cause the movement of the worm shaft by rotation: an axial force generation part including a screw member, the axial force generation part configured to exert an axial force on the holder only in one direction of the axis line direction by a screwing action resulting from rotation of the screw member, the axial force is a force in the axis line direction: and a base part provided to the frame, the base part configured to receive a reactive force acting on the axial force generation part as a result of exerting the axial force to the holder.

In addition, in the mechanical device having a worm gear mechanism according to the present invention, the position adjusting mechanism may be configured so that a screwing direction of the screw member of the axial force generation part coincides with the axis line direction. Further, the position adjusting mechanism may be configured so that the holder and the axial force generation part are engaged to each other so that the holder can take an arbitrary position in a direction in which the holder is rotated. Further, the axial force generation part may include: a cylinder member including an engaging surface that is engaged to the holder, the engaging surface intersects the axis line direction, the engaging surface is present in a circumferential direction: and the screw member configured to move the cylinder member in the axis line direction by the screwing action.

In the mechanical device having the worm gear mechanism according to the present invention, the position adjusting mechanism is configured such that the axial force by the axial force generation part is exerted on the holder provided in a state of being screwed into the accommodation hole of the frame and the reactive force of the axial force acting on the axial force generation part is received by the base part provided to the frame. According to the configuration, the axial force acts on the holder screwed into the accommodation hole of the frame, so that a force in the axis line direction acts on the screwed portion between the holder and the frame and the frictional force generated between the holder and the frame due to the force acts on the holder as a force that prevents rotation of the holder. In the screwing, the holder and the frame are in contact with each other over an entire circumference in the circumferential direction of the holder, there are a plurality of contact portions in the axis line direction, and a large frictional force is obtained as a whole. Therefore, the holder can be more securely fixed to the frame.

In addition, in such a mechanical device of the present invention, the position adjusting mechanism is configured so that the screwing direction of the screw member of the axial force generation part coincides with the axis line direction. Thereby, the holder can be more firmly fixed to the frame.

More specifically, as the configuration of the axial force generation part, a configuration is also considered in which a direction in which the force generated by the screwing action acts on the holder, i.e., a screwing direction of the screw member coincides with a direction (radial direction of the worm shaft) orthogonal to, for example, the axis line direction. In this case, an end portion of the holder is formed with an inclined surface and the axial force generation part exerts a force in the screwing direction on the inclined surface. However, in the case of this configuration, the axial force acting on the holder (the force in the axis line direction) becomes a component force of the force generated by the screwing action of the axial force generation part. In contrast, the axial force generation part of the position adjusting mechanism is configured so that the screwing direction coincides with the axis line direction. Thereby, the entire force generated by the screwing action acts on the holder as the axial force. Thereby, the holder is further firmly fixed to the frame, as compared to the configuration where the screwing direction coincides with the radial direction.

Further, in the case where the position adjusting mechanism is configured so that the screwing direction coincides with the axis line direction as described above, the position adjusting mechanism is configured so that the holder and the axial force generation part are engaged to each other in a form capable of taking an arbitrary position in a direction (rotation direction) in which the holder is rotated. Therefore, a position of the holder in the rotation direction is not restricted with respect to a position of the axial force generation part, so that the backlash can be adjusted more finely.

More specifically, as for the configuration of the position adjusting mechanism, for example, a configuration is also considered in which the holder and the axial force generation part are engaged with each other by screwing the screw member of the axial force generation part into the holder. However, in the case of this configuration, the position of the holder is restricted in the rotation direction by the position of the screw member of the axial force generation part. In contrast, when the position adjusting mechanism is configured such that the holder and the axial force generation part are engaged in a form capable of taking an arbitrary position in the rotation direction, the position of the holder in the rotation direction is not restricted with respect to the position of the screw member of the axial force generation part. Therefore, according to the configuration, when adjusting the backlash, the position of the holder in the rotation direction can be set to an arbitrary position, regardless of the position of the screw member of the axial force generation part, so that the backlash can be adjusted more finely.

Further, in the case where the position adjusting mechanism is configured so that the holder and the axial force generation part are engaged in a form capable of taking an arbitrary position as described above, the axial force generation part is configured such that the cylinder member having an engaging surface that is engaged to the holder and is present in the circumferential direction is moved in the axis line direction by the screwing action. Thereby, the engaging state between the axial force generation part and the holder is made firmer and the fixed state of the holder to the frame can be securely maintained.

More specifically, for example, even when the axial force generation part is configured such that the set screw screwed into a female screw hole of the frame (base part) is pressed against an end portion of the holder, the holder and the axial force generation part are engaged in a form capable of taking an arbitrary position as described above. However, in the case of this configuration, the axial force generation part is in contact (engages) with the holder only on a tip end face of the set screw. In contrast, the axial force generation part is configured to engage with the holder by the cylinder member having the engaging surface as described above, so that the axial force generation part and the holder are in contact (engaged) with each other by a surface extending in the circumferential direction. Therefore, according to the configuration, the frictional force generated between the axial force generation part (cylinder member) and the holder when the axial force generation part exerts the axial force on the holder becomes further larger, as compared to the case of the set screw described above. Thereby, the engaging state between the axial force generation part and the holder can be made firmer by the larger frictional force, and the fixed state of the holder to the frame can be securely maintained.

DESCRIPTION OF EMBODIMENTS

Figure 1:
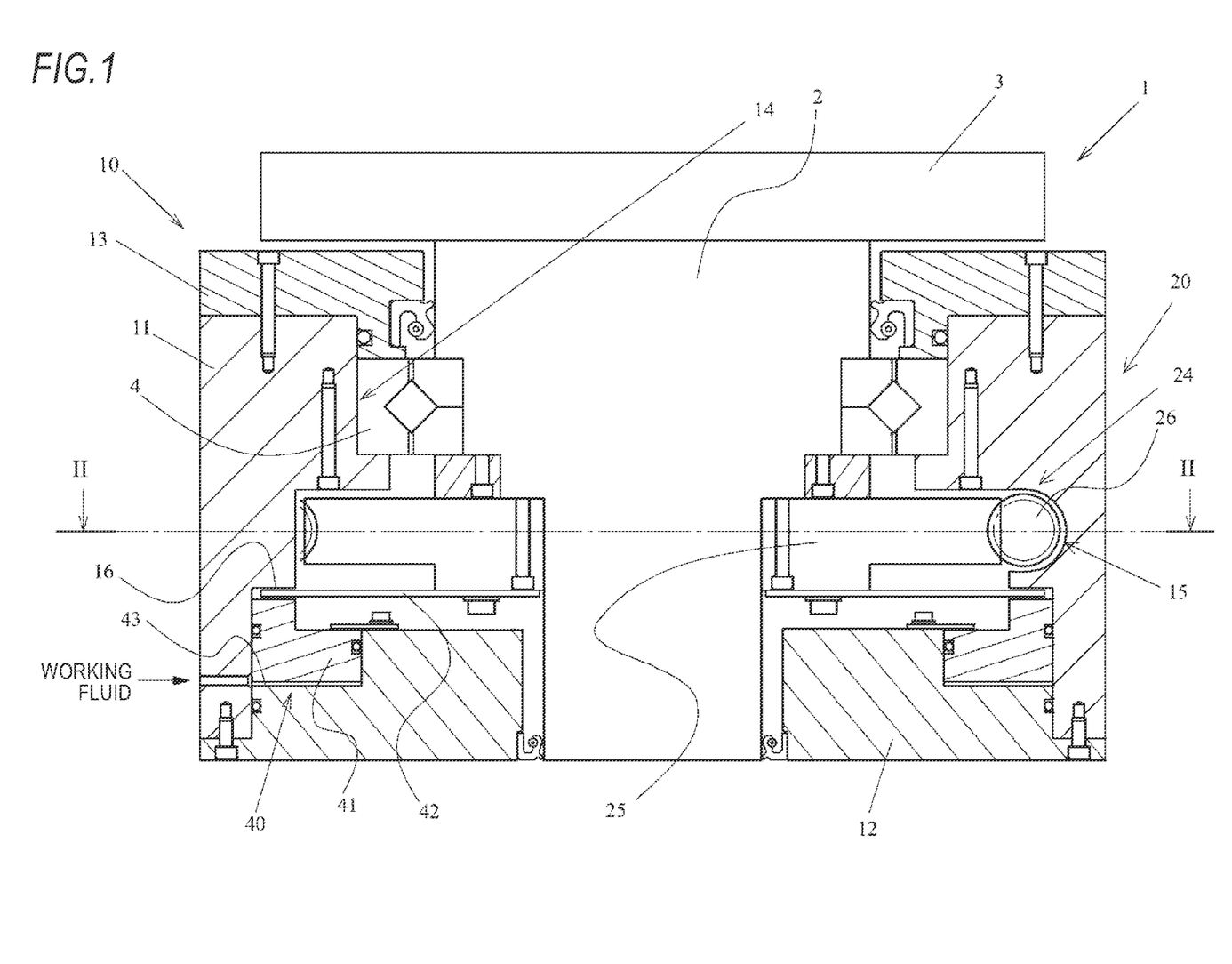
FIG. 1 is a side cross-sectional view showing one embodiment of a mechanical device having a worm gear mechanism device according to the present invention.
Figure 2:
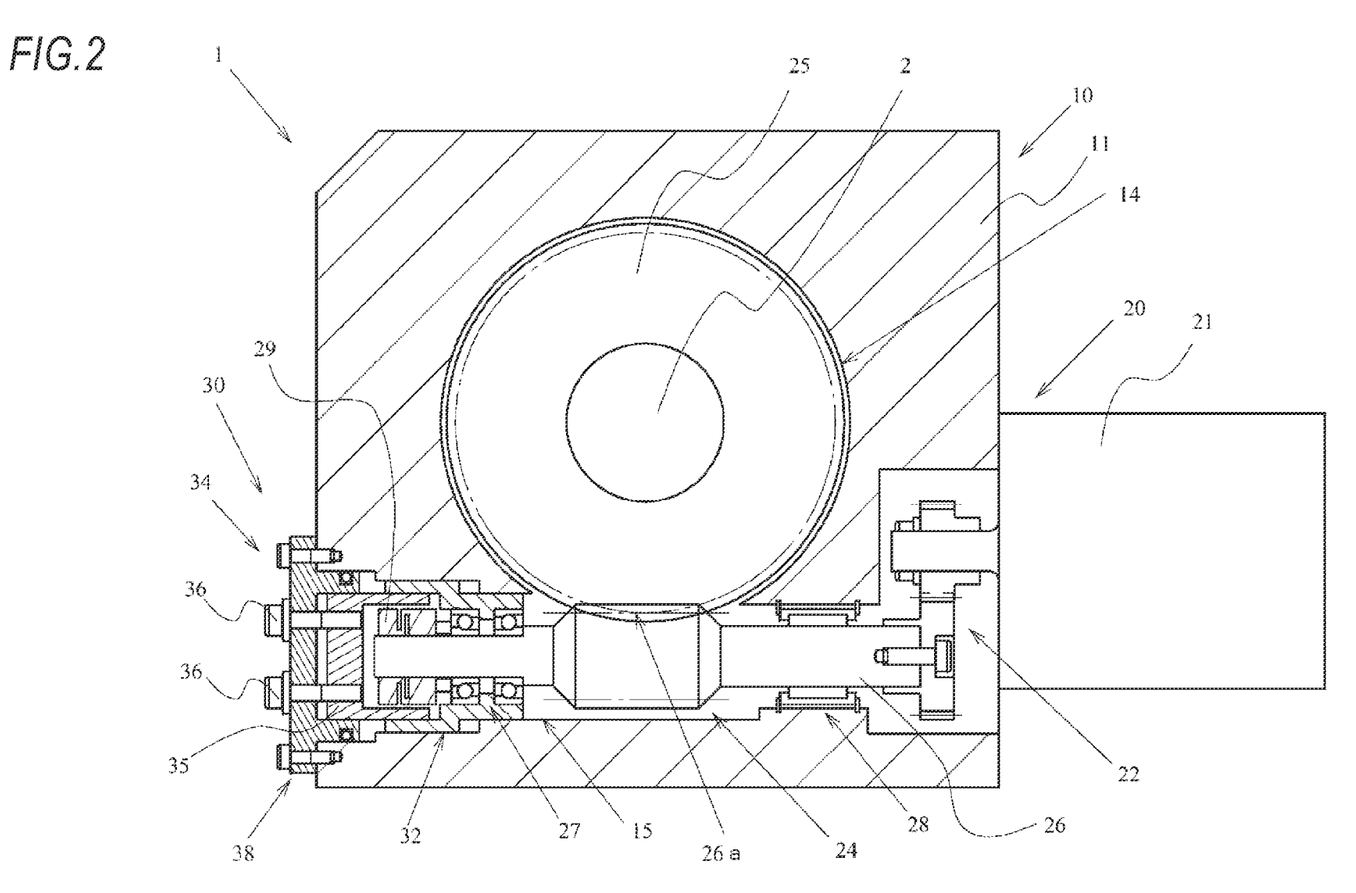
FIG. 2 is a cross-sectional view taken along an II-II line in FIG. 1.
Figure 3:
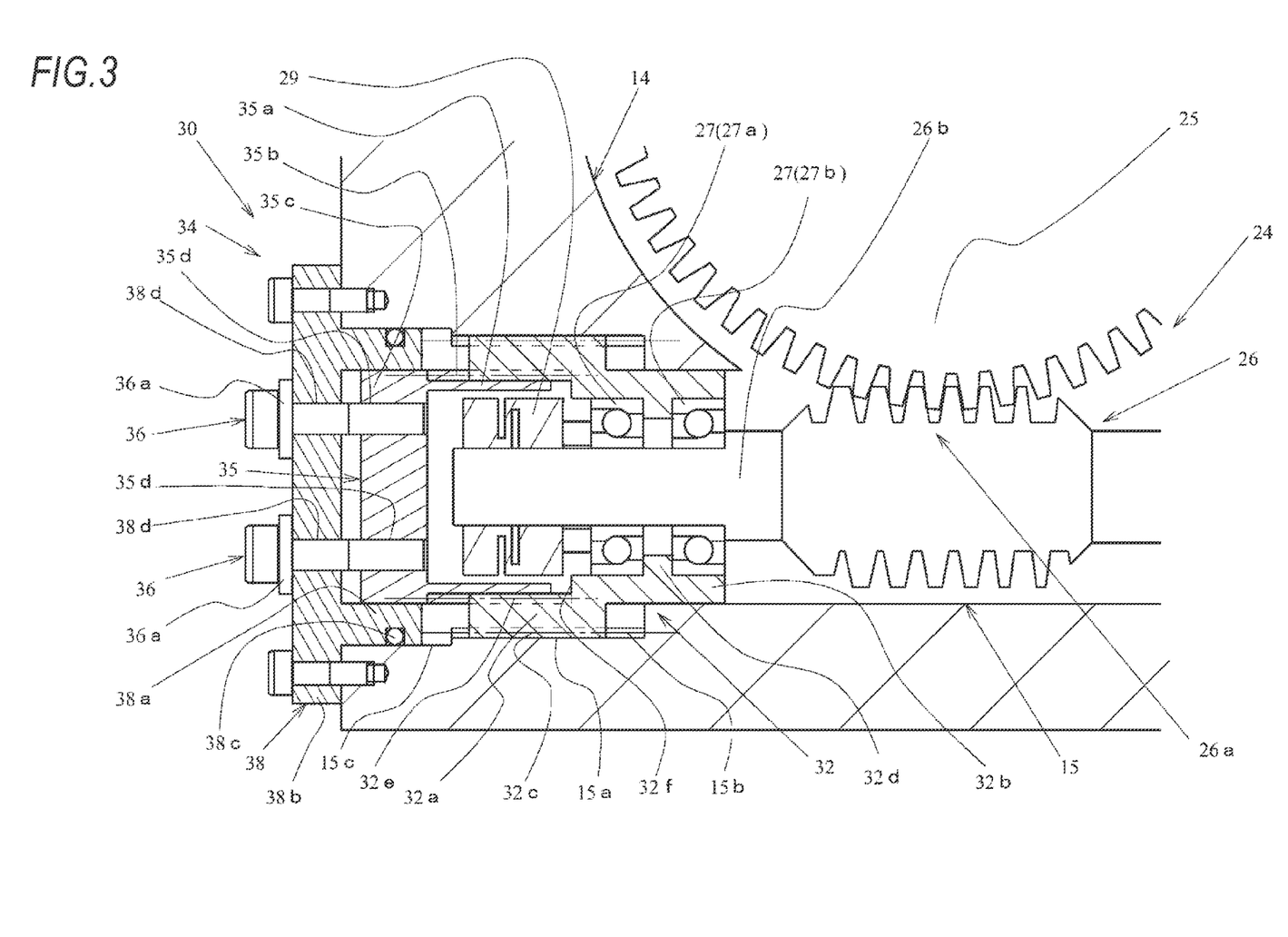
FIG. 3 is a partially cross-sectional plan view showing main parts in FIG. 2.

Hereinafter, one embodiment (embodiment) of a mechanical device having a worm gear mechanism of the present invention will be described with reference to FIGS. 1 to 3. Note that, the present embodiment is an example where the mechanical device is a rotation indexing device (so-called rotary table device) configured to index an angular position of a table on which a workpiece is placed around an axis line of a rotary shaft configured to support the table.

As shown, a rotary table device 1 is a so-called horizontal rotary table installed with an axis line of a rotary shaft 2 facing in a vertical direction. The rotary table device 1 includes, as constitutional elements, a frame 10 installed to a working machine or the like, a rotary shaft 2 rotatably supported with respect to the frame 10, and a table 3 attached on one end-side of the rotary shaft 2. In addition, the rotation table device 1 includes a drive mechanism 20 configured to rotationally drive and index the rotary shaft 2 to a set angular position, and a clamp mechanism 40 for maintaining (clamping) the rotary shaft 2 at the indexed angular position.

The frame 10 has an insertion hole 14 formed therein so as to arrange therein the rotary shaft 2 and a worm gear mechanism 24 (which will be described later) of the drive mechanism 20. Note that, in the shown example, the frame 10 is constituted by a main body part 11, which is a main part of the frame 10 and has a through-hole formed therein, a cover part 13 fixed to the main body part 11 in a form of contacting an end face on one end-side in a penetration direction of the through-hole, and a bottom part 12 fixed to the main body part 11 in a form of being fitted in the through-hole on the other end-side in the penetration direction.

The insertion hole 14 in the frame 10 is formed by a through-hole in the main body part 11 and a through-hole formed in the cover 13 and the bottom 12. In addition, the insertion hole 14 has an inner diameter capable of accommodating the rotary shaft 2 in each portion in the penetration direction. Further, the rotary shaft 2 is arranged in the insertion hole 14 and is supported with respect to the frame 10 by a bearing 4 interposed between the rotary shaft and the main body part 11. Further, the through-hole in the main body part 11, which constitutes a part of the insertion hole 14, is formed so that a part of an inner diameter thereof is large enough to accommodate a worm gear mechanism 24 as well.

The drive mechanism 20 includes a drive motor 21 as a drive source for rotationally driving the rotary shaft 2, and a worm gear mechanism 24 configured to transmit rotation of an output shaft of the drive motor 21 to the rotary shaft 2. In addition, the worm gear mechanism 24 includes a worm wheel 25 attached to the rotary shaft 2 so as not to be relatively rotatable, and a worm shaft 26 having a worm 26a in mesh with the worm wheel 25.

The worm 26a is a so-called double-lead type worm in which leads are slightly different on the left and right sides of a tooth surface and a tooth thickness dimension gradually increases toward one side, in an axis line direction, of the worm shaft 26. The worm gear mechanism 24 including such a double-lead type worm 26a is configured to adjust backlash between the worm 26a and the worm wheel 25 by moving the worm shaft 26 in the axis line direction.

The worm shaft 26 is provided in the frame 10 in a form of being accommodated in an accommodation hole 15 formed to communicate with the insertion hole 14 in the main body part 11 of the frame 10. The accommodation hole 15 is formed such that a drilling direction thereof is orthogonal to the penetration direction and it penetrates so as to open on both side surfaces of the main body part 11.

In addition, the drive motor 21 is attached to one of both the side surfaces of the main body part 11 in such a form that the output shaft thereof is inserted into the accommodation hole 15. Further, the drive motor 21 is connected at the output shaft thereof to the worm shaft 26 via a gear train 22. In addition, in the rotary table device 1, drive of the drive motor 21 is controlled according to a preset numerical control program, so that the rotary shaft 2 (table 3) is indexed to an angular position set in the numerical control program.

In the present embodiment, the clamp mechanism 40 is a so-called disc type clamp mechanism. Specifically, the clamp mechanism 40 is configured to sandwich a clamp disc 42 fixed to the rotary shaft 2 between a clamp piston 41 and the frame 10 (clamp surface 16) by a pressure of a working fluid, thereby clamping the rotary shaft 20.

In addition, the worm shaft 26 provided in the accommodation hole 15 of the frame 10 as described above is configured to have the worm 26a at a central portion in the axis line direction. Further, the worm shaft 26 is supported with respect to the frame 10 by bearings 27 and 28 provided on both sides of the worm 26a. However, on one end-side of the accommodation hole 15 (opposite side to a side on which the worm shaft 26 is connected to the drive motor 21), a holder 32 is provided in the accommodation hole 15, and the bearing 27 on the one end-side is provided in a form of being embedded in the holder 32.

Note that, the holder 32 is a hollow cylindrical member, and is provided in the accommodation hole 15 in a state where a direction of an axis center thereof is made to coincide with the drilling direction. In addition, the worm shaft 26 is provided in the accommodation hole 15 in a state where an axis line direction thereof is made to coincide with the drilling direction. Therefore, in the state where the worm shaft 26 is provided in the accommodation hole 15, all of these directions are the same, and therefore, in the following, all the directions are referred to as "(the above-described) axis line direction".

The holder 32 is formed so that an outer diameter of a portion closer to one end-side than an intermediate portion with respect to the axis line direction is larger than an outer diameter of a portion on the other end-side, and is formed to have a step portion at the intermediate portion on an outer peripheral surface. That is, the holder 32 has a configuration where the portion closer to one end-side than the intermediate portion is formed as a large-diameter portion 32a having a larger outer diameter and the other end-side is formed as a small-diameter portion 32b having a smaller outer diameter. In addition, a male screw 32c is formed on an outer peripheral surface of the large-diameter portion 32a of the holder 32.

The holder 32 is provided on one end-side of the accommodation hole 15 in such a form that the small-diameter portion 32b is directed toward a center side of the accommodation hole 15 and the male screw 32c formed on the outer peripheral surface of the large-diameter portion 32a is screwed to the main body part 11 of the frame 10. Therefore, a portion (arrangement portion) 15a, in which the large-diameter portion 32a is expected to be arranged when the holder 32 is provided in the accommodation hole, of the accommodation hole 15 formed in the main body part 11 has an inner diameter corresponding to the outer diameter of the large-diameter portion 32a and is formed on an inner peripheral surface with a female screw 15b. However, the arrangement portion 15a is formed larger than the large-diameter portion 32a of the holder 32 in the axis line direction.

In addition, on one end-side of the accommodation hole 15, a portion closer to the center side than the arrangement portion 15a has an inner diameter smaller than that of the arrangement portion 15a, and the inner diameter thereof has such a size that the small-diameter portion 32b of the holder 32 is fitted. Thereby, on one end-side of the accommodation hole 15, the holder 32 is in a state where it is screwed to the main body part 11 (arrangement portion 15a) at the large-diameter portion 32a and the small-diameter portion 32b is fitted in the accommodation hole 15. Note that, a portion (outer portion) 15c on an outermore side (opposite side to the center side) than the arrangement portion 15a of the accommodation hole 15 is formed so that an inner diameter thereof is further larger than the arrangement portion 15a.

Further, the holder 32 is formed such that, regarding the inner diameter thereof, an inner diameter of the large-diameter portion 32a is larger than an inner diameter of the small-diameter portion 32b, and is formed to have a step portion at the intermediate portion on the inner peripheral surface. Therefore, the holder 32 has a step surface 32f, which is a surface parallel to a radial direction and faces toward the large-diameter portion 32a, at a boundary between the large-diameter portion 32a and the small-diameter portion 32b on the inner peripheral surface thereof.

As for the bearing 27, two bearings are embedded in the holder 32 in arrangement of being located in the small-diameter portion 32b. The small-diameter portion 32b is formed at a substantially central portion in the axis line direction with an annular protrusion 32d provided in a form of protruding from the inner peripheral surface thereof. One of the two bearings 27 is arranged to be in contact with the protrusion 32d on the large-diameter portion 32a-side with respect to the protrusion 32d in the axis line direction, and the other is arranged to be in contact with the protrusion 32d on an opposite side with respect to the protrusion 32d.

Further, the worm shaft 26 is in a state of being supported by the holder 32 provided as described above in such a form that the shaft portion 26b is fitted into the bearings 27a and 27b embedded in the holder 32. Note that, the shaft portion 26b, which is on a side supported by the holder 32, of shaft portions on both sides of the worm 26a of the worm shaft 26 is formed such that a portion closer to the worm 26a-side than a portion fitted into the bearing 27 has a larger shaft diameter than that of the portion fitted into the bearing 27. That is, the shaft portion 26b of the worm shaft 26 is formed to have a portion (diameter-enlarged portion) at which a shaft diameter is enlarged between the portion fitted into the bearing 27 and the portion closer to the worm 26a-side. In a state where the worm shaft 26 is fitted into the bearing 27 as described above, the other bearing 27b on the worm 26a-side is in contact with an end face of the diameter-enlarged portion.

In addition, a locknut 29 for fixing relative positions of the holder 32 (bearings 27a and 27b) and the worm shaft 26 in the axis line direction is screwed to a further end portion-side than the portion, which is fitted into the bearing 27, of the shaft portion 26b of the worm shaft 26. More specifically, the shaft portion 26b is formed on an outer peripheral surface with a male screw on a further end portion-side than the portion, which is fitted into the bearing 27, of the shaft portion 26b. In addition, the locknut 29 is screwed to the male screw formed on the outer peripheral surface on the end portion-side of the shaft portion 26b. For reference, in the shown example, on the shaft portion 26b, an annular member such as a washer is interposed between the screwed locknut 29 and the one bearing (bearing in contact with the large-diameter portion 32a-side of the protrusion 32d of the holder 32) 27a.

When the locknut 29 is tightened, the locknut 29 exerts a force on the one bearing 27a toward the diameter-enlarged portion of the worm shaft 26 in the axis line direction. Further, the force acts on the other bearing 27b via the one bearing 27a and the protrusion 32d of the holder 32, and is received by the end face of the diameter-enlarged portion. Thereby, the other bearing 27b is sandwiched between the diameter-enlarged portion of the worm shaft 26 and the protrusion 32d of the holder 32. Along with this, the one bearing 27a is in a state of being sandwiched between the protrusion 32d and the locknut 29 (the annular member). As a result, the holder 32 and the worm shaft 26 are in a state where relative positions in the axis line direction are fixed each other. However, as a matter of course, both can rotate relative to each other.

Note that, as described above, the holder 32 is provided in the accommodation hole 15 in a state of being screwed to the main body part 11 (accommodation hole 15) of the frame 10. Therefore, when the holder 32 is rotated, the holder 32 is displaced in the axis line direction in the accommodation hole 15. Since the relative positions of the holder 32 and the worm shaft 26 in the axis line direction are fixed each other as described above, the worm shaft 26 is also displaced in the axis line direction as the holder 32 is displaced as described above. Therefore, regarding adjustment of the backlash performed by displacing the worm shaft 26 in the axis line direction as described above, the displacement in the axis line direction of the worm shaft 26 for the adjustment is performed by rotating the holder 32.

In addition, in the main body part 11 (accommodation hole 15) of the frame 10 in which the holder 32 is provided as described above, on one end-side of the accommodation hole 15, an opening portion of a side surface on the other side (opposite side to the side on which the drive motor 21 is attached) of both side surfaces of the main body part 11 is provided with a lid-shaped member (lid member) 38 for closing the opening. The lid member 38 has a fitting portion 38a that is a portion fitted into the accommodation hole 15 and an attaching portion 38b that is a portion for attaching the lid member 38 (fitting portion 38a) to the main body part 11 of the frame 10.

As for the lid member 38, more specifically, the fitting portion 38a has a hollow cylindrical shape and is formed such that an outer diameter thereof is substantially the same as the inner diameter of the outer portion 15c of the accommodation hole 15 and an inner diameter thereof is larger than the inner diameter of the large-diameter portion 32a of the holder 32. In addition, the attaching portion 38b is a disk-shaped portion and is formed such that an outer diameter thereof is larger than the outer diameter of the fitting portion 38a.

In addition, the lid member 38 has a configuration where the fitting portion 38a and the attaching portion 38b are integrally formed. As for the configuration, specifically, the lid member 38 has a configuration where the fitting portion 38a and the attaching portion 38b are integrated in such a form that the attaching portion 38b is located to be continuous with an end edge on one end-side of the fitting portion 38a in the axis line direction of the fitting portion 38a and an axis center of the fitting portion 38a and an axis center of the attaching portion 38b coincide with each other, when seen in the axis line direction of the fitting portion 38a.

The lid member 38 is attached to the main body part 11 in a state where the fitting portion 38a is fitted into the outer portion 15c of the accommodation hole 15 and the attaching portion 38b is in contact with the other side surface of the main body part 11. In addition, the attachment is performed in a form of screwing, into the main body part 11, a plurality of screw members inserted in the attaching portion 38b of the lid member 38 in a thickness direction thereof. For reference, in the state where the lid member 38 is attached to the main body part 11 in this way, a seal member 38c such as an O-ring is interposed between an outer peripheral surface of the fitting portion 38a and an inner peripheral surface of the outer portion 15c of the accommodation hole 15.

Further, on one end-side of the accommodation hole 15, a cylinder member 35 is provided between the holder 32 and the lid member 38. The cylinder member 35 is a bottomed cylindrical member, and has a cylindrical portion 35a, which is a portion having a cylindrical shape, and a base end portion 35c, which closes an opening of the cylindrical portion 35a on one end-side of the cylindrical portion 35a. Further, a male screw 35b is formed on an outer peripheral surface of the cylindrical portion 35a. On the other hand, a female screw 32e is formed on an inner peripheral surface of the large-diameter portion 32a of the holder 32.

The cylinder member 35 is provided in a state where the cylindrical portion 35a is directed toward the holder 32 and the cylindrical portion 35a is engaged in a form of being screwed to the large-diameter portion 32a (female screw 32e) of the holder 32 by a flank surface of the male screw 35b. Therefore, the flank surface of the male screw 35b on the cylinder member 35 corresponds to the engaging surface.

Further, the cylinder member 35 (cylindrical portion 35a) has such an outer diameter that such a screwed state can be achieved in relation to the inner diameter of the large-diameter portion 32a of the holder 32. An outer diameter of the cylinder member 35 is substantially the same as (or slightly smaller than) an inner diameter of the fitting portion 38a of the lid member 38 described above.

Note that, a dimension of the cylinder member 35 in the axis line direction is such a size that a position of the base end portion 35c overlaps with at least a portion of a position of the fitting portion 38a of the lid member 38 in the axis line direction in an attached state where the cylindrical portion 35a is screwed to the large-diameter portion 32a of the holder 32. A position of the cylinder member 35 in the axis line direction in the attached state is a position where a gap is present between the base end portion 35c and the attaching portion 38b of the lid member 38.

In addition, the dimension of the cylinder member 35 in the axis line direction is such a size that allows the displacement of the holder 32 for the backlash adjustment described above, i.e., a gap exists between a tip end of the cylindrical portion 35a and the step surface 32f of the holder 32 even in a state where the holder 32 is located on the outermost side (the lid member 38-side) in the displacement. Further, in order to allow the displacement of the holder 32, a dimension of the cylindrical portion 35a of the cylinder member 35 in the axis line direction (thickness dimension of the base end portion 35c) is such a size that a gap is formed between an end face of the worm shaft 26 and the base end portion 35c in a state where the holder 32 is located on the outermost side, i.e., a state where the end face of the worm shaft 26 is located on the outermost side.

Note that, in the attached state, the cylinder member 35 is arranged so that the position of the cylindrical portion 35a overlaps, in the axis line direction, with the position of the locknut 29 screwed and fitted to the worm shaft 26 as described above. Therefore, the cylindrical portion 35a is formed to have an inner diameter larger than an outer diameter of the locknut 29 so that the locknut 29 can be located inside the cylindrical portion.

In addition, a screw member 36 for moving the cylinder member 35 in the axis line direction by a screwing action is provided between the cylinder member 35 in the attached state and the lid member 38. More specifically, the lid member 38 has a screw insertion hole 38d formed to penetrate in a thickness direction of the attaching portion 38b and having an inner diameter in which the screw member 36 can be inserted. In addition, the two screw insertion holes 38d are formed at positions symmetrical with respect to the center of the attaching portion 38b, when seen in the thickness direction of the attaching portion 38b. However, the two screw insertion holes 38d and 38d are formed to be located within an existence range of the base end portion 35c of the cylinder member 35, when seen in the axis line direction.

On the other hand, the cylinder member 35 is formed with two female screw holes 35d and 35d into which the two screw members 36 and 36 inserted into the screw insertion holes 38d are screwed, respectively. In addition, each female screw hole 35d is formed to penetrate in the thickness direction of the base end portion 35c of the cylinder member 35. The two female screw holes 35d and 35d are formed at positions that can be positionally aligned with the two screw insertion holes 38d and 38d formed in the lid member 38 (attaching portion 38b), when seen in the axis line direction.

Further, in the attached state, the two screw members 36 and 36 are inserted into the respective screw insertion holes 38d of the lid member 38 (attaching portion 38b), and are screwed into the respective female screw holes 35d of the cylinder member 35 (base end portion 35c). Note that, in the present embodiment, the screw member 36 is a screw member such as a bolt having a head. In addition, a washer 36a is interposed between the head of the screw member 36 and the attaching portion 38b. Further, a length dimension (dimension in the axis line direction) of the screw member 36 is such a size that the screw member 36 is screwed over most of the female screw hole 35d of the base end portion 35c and a tip end thereof does not protrude from the base end portion 35c with respect to the axis line direction in a state where the head is in contact with the attaching portion 38b via the washer 36a. For reference, the washer 36a is a washer such as a seal washer having a sealing function so that an internal fluid (lubricating oil, in the present embodiment) does not leak from the screw insertion hole 38d.

According to the rotary table device 1 configured as described above, in the attached state, when the screw member 36 is rotated in a tightening direction from the state where the head thereof is in contact with the attaching portion 38b of the lid member 38 via the washer 36a, a tensile force toward the lid member 38 (attaching portion 38b) is exerted on the cylinder member 35 by the screwing action resulting from the rotation of the screw member 36 because movement of the screw member 36 toward the cylinder member 35 in the axis line direction is restricted by the attaching portion 38b due to the contact. Thereby, although the cylinder member 35 is in a state of being screwed to the female screw 32e of the large-diameter portion 32a of the holder 32 at the male screw 35b of the cylindrical portion 35a, the cylinder member moves by an amount of a gap (backlash) between the male screw 35b and the female screw 32e.

The male screw 35b is pressed against the female screw 32e by the movement, so that the tensile force (axial force) in the axis line direction acts on the holder 32. Therefore, a combination of the screw member 36 and the cylinder member 35 that exert such an axial force on the holder 32 corresponds to the axial force generation part referred to in the present invention. In addition, in a state where the axial force is exerted on the holder 32 in this way, the reactive force is received by the lid member 38 (attaching portion 38b) which is attached to the frame 10 (main body part 11) and with which the head of the screw member 36 is in contact. Therefore, the lid member 38 corresponds to the base part referred to in the present invention. Since the holder 32 is rotated to move the worm shaft 26 for backlash adjustment as described later, a combination of the holder 32 with the axial force generation part 34 and the base part described above is the position adjusting mechanism referred to in the present invention.

Further, when the axial force acts on the holder 32 as described above, the male screw 32c of the large-diameter portion 32a of the holder 32 is pressed against the female screw 15b of the accommodation hole 15 (arrangement portion 15a) of the frame 10 screwed in the male screw 32c, in the direction (tensile direction) in which the axial force acts. As a result, a frictional force corresponding to the axial force is generated between the male screw 32c and the female screw 15b, and the frictional force acts on the holder 32, as a force for preventing the rotation of the holder 32.

Note that, the holder 32 and the accommodation hole 15 are screwed each other by the male screw 32c and the female screw 15b as described above, and the pressed state is a state where both are in contact with each other over the entire circumference of the holder 32 and at a plurality of locations in the axis line direction. Thereby, a large frictional force is generated between the holder 32 (male screw 32c) and the accommodation hole 15 (female screw 15b) as a whole, and the large frictional force acts on the holder 32. The holder 32 is more firmly fixed to the frame 10 by the action of such a large frictional force.

Moreover, the axial force generation part 34 of the present embodiment is configured so that the screwing direction of the screw member 36 coincides with the axis line direction. Thereby, the tensile force acting on the cylinder member 35 by the screwing action of the screw member 36 is a force whose acting direction coincides with the axis line direction. Therefore, according to the configuration, the entire tensile force acts on the holder 32 as the axial force, so that the fixing of the holder 32 to the frame 10 becomes further firmer.

Further, the axial force generation part 34 (cylinder member 35) configured to engage with the holder 32 in the axis line direction so as to exert the axial force on the holder 32 is provided in such a form that the cylinder member 35 is screwed to the holder 32. Thereby, the axial force generation part 34 (cylinder member 35) and the holder 32 are in a state where they can take a relatively arbitrary position (phase) in the direction (rotation direction) in which the holder 32 is rotated. Therefore, in the configuration, the phase of the holder 32 is not restricted to the phase of the axial force generation part 34, so that the backlash is adjusted more finely.

Further, since the holder 32 and the cylinder member 35 are engaged in a screwing form as described above, in the engaged state, a large frictional force acts on the cylinder member 35, similar to the relationship between the holder 32 and the accommodation hole 15 described above. Therefore, such a large frictional force acts, so that the engaged state between the cylinder member 35 and the holder 32 becomes firmer and the fixed state of the holder 32 to the frame 10 is securely maintained.

When adjusting the backlash in the rotary table device 1 configured as described above, the screw member 36 tightened to maintain the fixed state of the holder 32 to the frame 10 as described above is first loosened so that the axial force (tensile force) resulting from the screwing action of the screw member 36 does not act on the holder 32. Thereby, the fixed state of the holder 32 to the frame 10 is released, and the holder 32 becomes in a state capable of rotating with respect to the frame 10. In addition, the holder 32 is rotated to move the worm shaft 26 in the axis line direction, thereby adjusting the backlash.

Further, after the adjustment of the backlash is completed, the screw member 36 loosened as described above is tightened again, so that the holder 32 is rotatably fixed to the frame 10 as described above. Then, the fixed state of the holder 32 to the frame 10 is maintained in this way, so that an amount of the adjusted backlash does not change (is maintained).

In the above, one embodiment (hereinafter, referred to as 'above embodiment') of the mechanical device having the worm gear mechanism to which the present invention is applied has been described. However, the present invention is not limited to the above embodiment, and can also be implemented by other embodiments (modified embodiments) as described below.

(1) As for the axial force generation part, in the above embodiment, the axial force generation part 34 is configured so that the direction in which the axial force is exerted on the holder 32 is the tensile direction toward the lid member 38-side. However, in the present invention, the axial force generation part is not limited to the configuration by which the axial force is exerted in the tensile direction, and may also be configured so that the axial force is exerted in the direction (pressing direction) of pressing the holder 32 toward the worm 26a.

Figure 4:
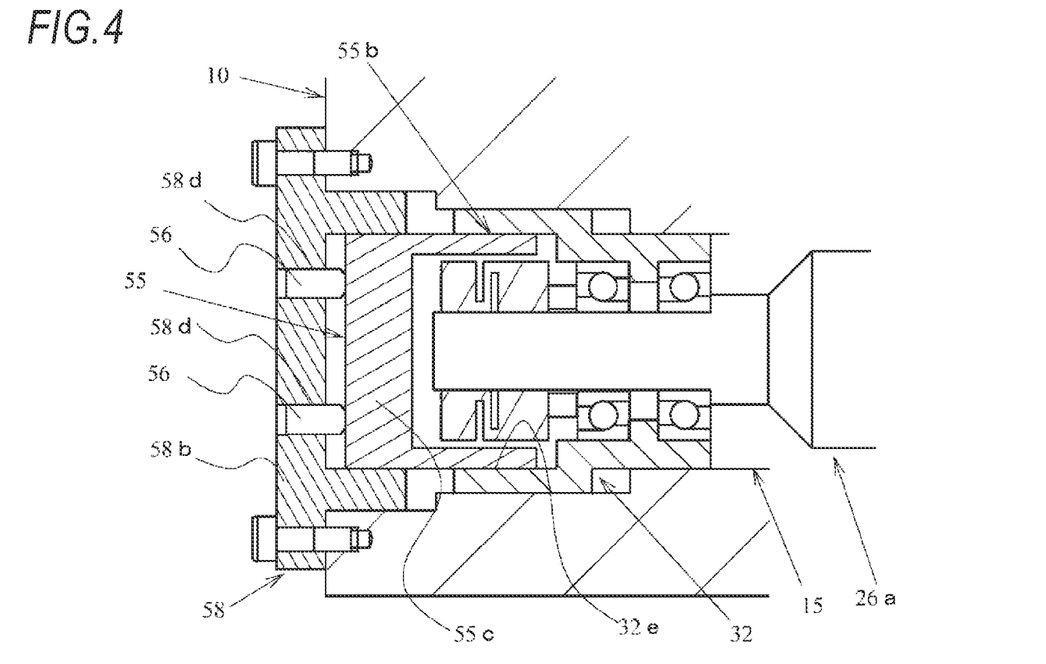
FIG. 4 is a partially cross-sectional plan view showing main parts in another embodiment of the mechanical device having the worm gear mechanism device according to the present invention.

Specifically, for example, a configuration shown in FIG. 4 is considered as an example. The configuration of FIG. 4 is an example where the holder 32 itself is the same as that of the above embodiment, a cylinder member is provided in a form of being screwed to the holder 32 as in the above embodiment, and the screw member is a set screw, instead of the bolt as in the above embodiment. However, in this example, a cylinder member 55 does not have a female screw hole in a base end portion 55c, unlike the above embodiment, and a lid member 58 has a hole formed in an attaching portion 58b, which is not a mere hole as in the above embodiment but is configured to be a female screw hole 58d.

The lid member 58 is formed with the two female screw holes 58d, and the set screws 56 are screwed into the respective female screw holes 58d and provided in a form of protruding from the attaching portion 58b toward the cylinder member 55. Note that, the two set screws 56 and 56 are basically provided in such a form that tip ends thereof are in contact with the base end portion 55c of the cylinder member 55.

According to the configuration, when the set screw 56 is tightened from the state of being in contact with the cylinder member 55 (base end portion 55c), the set screw 56 exerts a force (pressing force) in the pressing direction on the cylinder member 55 while the reactive force is received at a portion screwed with the lid member 58 (attaching portion 58b). Then, the pressing force acts on the holder 32, as the axial force, so that the holder 32 is fixed to the frame 10 by the frictional force generated between the holder 32 and the frame 10 (accommodation hole 15) as in the above embodiment. Therefore, also in this example, the lid member 58 corresponds to the base part, and a combination of the set screw 56 and the cylinder member 55 corresponds to the axial force generation part.

Note that, in the case of this example, the direction of the axial force acting on the holder 32 is opposite to that in the above embodiment. Thereby, the male screw 55b of the cylinder member 55 is pressed against and engaged with the female screw 32e of the holder 32 on the flank surface in the opposite direction to that in the above embodiment. Therefore, in this example, the engaging surface of the cylinder member 55 is the flank surface of the male screw 55b in the opposite direction to that in the above embodiment.

(2) As for the engaging between the holder and the axial force generation part, in the example described above, the axial force generation part includes the cylinder member, and the cylinder member is screwed to the holder 32, so that the holder and the cylinder member are engaged such that the cylinder member can exert the axial force on the holder 32. However, in the present invention, even when the axial force generation part includes the cylinder member, the configuration for engaging the holder and the cylinder member is not limited to the above configuration where both are screwed as described above.

Figure 5:
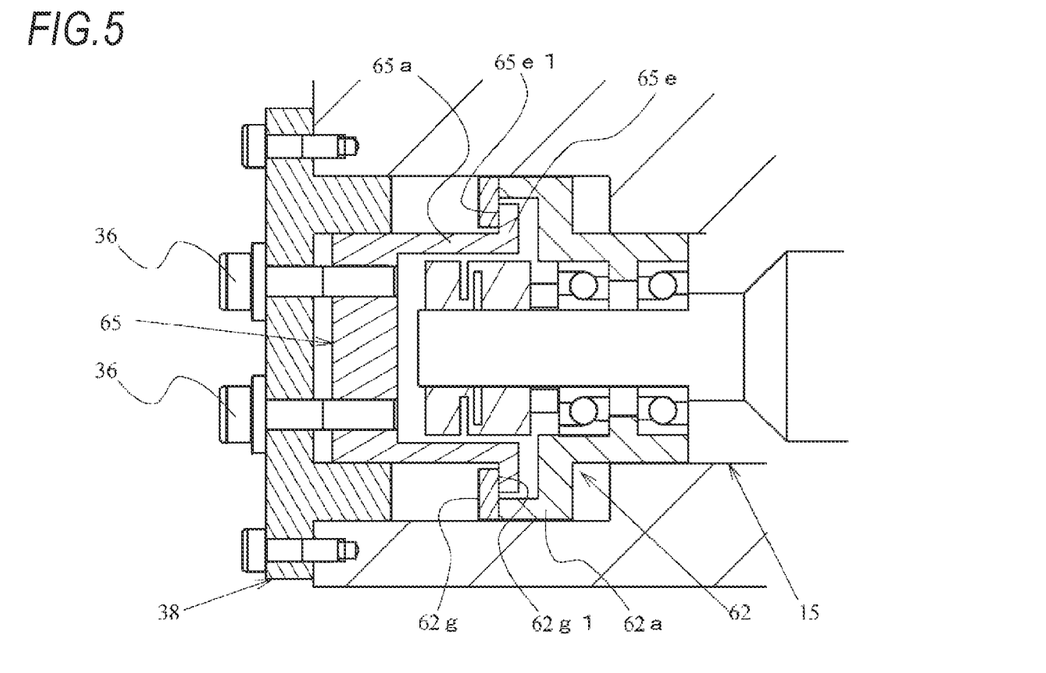
FIG. 5 is a partially cross-sectional plan view showing main parts in another embodiment of the mechanical device having the worm gear mechanism device according to the present invention.

Specifically, a configuration shown in FIG. 5 is considered as an example. The configuration of FIG. 5 is such a configuration that the lid member 38 and the screw member 36 are the same as those in the above embodiment and the tensile force is exerted on the cylinder member by the screwing action of the screw member 36 as in the above embodiment. However, in this example, a cylinder member 65 does not have a male screw on a cylindrical portion 65a, and is configured such that the cylindrical portion 65a has a flange-shaped portion (diameter-enlarged portion) 65e formed at a tip end portion (end portion on a holder 62-side) in a form of enlarging an outer diameter.

In addition, the holder 62 does not have a female screw on an inner peripheral surface of a large-diameter portion 62a, and a (doughnut-shaped) disk-shaped member (disk portion) 62g having a through-hole is attached to an end face of the large-diameter portion 62a. Note that, an inner diameter of the through-hole of the disk portion 62g is slightly larger than an outer diameter of the cylindrical portion 65a of the cylinder member 65 and smaller than an outer diameter of the diameter-enlarged portion 65e.

Further, the cylinder member 65 is arranged with respect to the holder 62 in the axis line direction such that the diameter-enlarged portion 65e is located closer to a small-diameter portion 62b of the holder 62 than the disk portion 62g. Thereby, an end face 65e1, which faces toward the cylindrical portion 65a, of the diameter-enlarged portion 65e of the cylinder member 65 and an end face 62g1, which faces toward the small-diameter portion 62b, of the disk portion 62g of the holder 62 are in a state of facing each other in the axis line direction. Further, the cylinder member 65 is basically arranged at a position where the end surface 65e1 is in contact with the end surface 62g1 of the holder 62 in the axis line direction.

According to the configuration, when the tensile force is exerted on the cylinder member 65 by the screwing action of the screw member 36, the axial force in the tensile direction is exerted on the end face 62g1 of the holder 62 with which the end face 65e1 of the cylinder member 65 is in contact as described above. Therefore, in this example, the end face 65e1 is an engaging surface of the cylinder member 65. Also in the configuration, the axial force acts on the holder 62 in this way, so that the similar effects to those of the above embodiment are obtained.

Note that, in the configuration where the holder and the cylinder member are engaged with each other at the end faces facing in the axis line direction as described above, in the example of FIG. 5, the axial force acts in the tensile direction. However, a configuration is also possible in which the axial force acts in the pressing direction. Specifically, as in the example of FIG. 5, the cylinder member is configured to have a diameter-enlarged portion and the holder is configured to have a disk portion, and then the cylinder member is arranged at a position where the diameter-enlarged portion is located closer to the lid member than the disk portion of the holder and the diameter-enlarged portion is in contact with the disk portion. In addition, it is configured so that the pressing force is exerted on the cylinder member by a mechanism using the set screw as shown in FIG. 4. As a result, the axial force in the pressing direction can be exerted on the holder.

(3) As for the axial force generation part, in the example described above, the axial force generation part has the cylinder member, and the cylinder member is configured to exert the axial force on the holder. However, in the present invention, the axial force generation part is not limited to having such a cylinder member.

Figure 6:
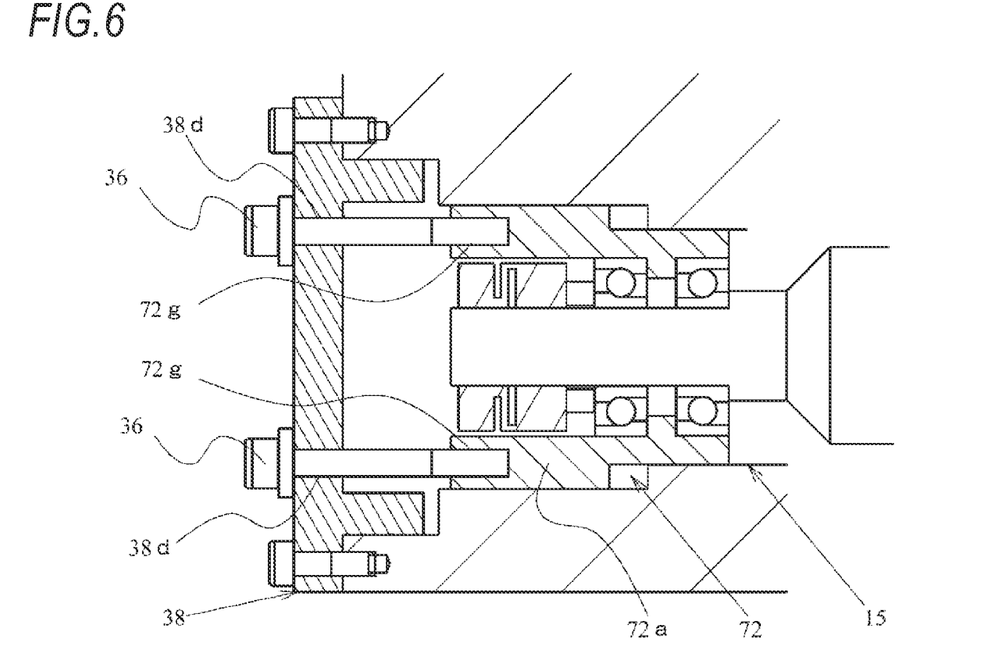
FIG. 6 is a partially cross-sectional plan view showing main parts in another embodiment of the mechanical device having the worm gear mechanism device according to the present invention.

Specifically, a configuration shown in FIG. 6 is considered as an example. The configuration of FIG. 6 is such a configuration that the lid member 38 is the same as that of the above embodiment and a holder 72 is screwed into the accommodation hole 15 as in the above embodiment but the cylinder member is not provided and the screw member 36 inserted into the lid member 38 is directly screwed into the holder 72. Therefore, the holder 72 is formed to have two female screw holes 72g and 72g, which open to an end face of a large-diameter portion 72a and into which the screw members 36 are screwed, and the axial force generation part is configured only by the two screw members 36 and 36 screwed into the female screw holes 72g and 72g. Also in this configuration, when the screw member 36 is tightened, the axial force in the tensile direction acts on the holder 72, and as a result, the similar effects to those of the above embodiment are obtained.

Figure 7:
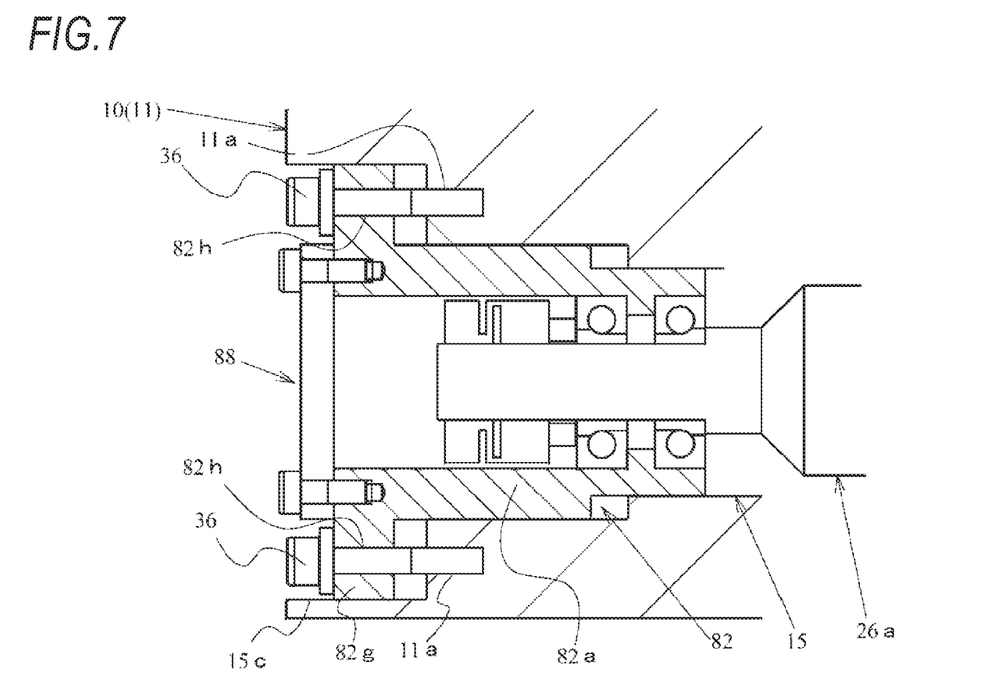
FIG. 7 is a partially cross-sectional plan view showing main parts in another embodiment of the mechanical device having the worm gear mechanism device according to the present invention.

Further, in the configuration without the cylinder member, as described above, in the example of FIG. 6, the axial force generation part is configured so that the axial force acts on the holder in the tensile direction. However, for example, as shown in FIG. 7, the axial force generation part can also be configured so that the axial force acts in the pressing direction. In the example of FIG. 7, a holder 82 is formed to have a flange-shaped portion (flange portion) 82g formed in a form of enlarging an outer diameter at an end portion of a large-diameter portion 82a on an opposite side to the worm 26a-side. In addition, an outer diameter of the flange portion 82g is substantially the same as the inner diameter of the outer portion 15c of the accommodation hole 15. Further, the flange portion 82g is formed with two screw insertion holes 82h and 82h, which penetrate through the flange portion in a thickness direction thereof and in which the screw members 36 are inserted. The holder 82 is provided in the accommodation hole 15 in such a form that the flange portion 82g is arranged in the outer portion 15c in the axis line direction and is loosely fitted in the outer portion 15c.

In contrast, the main body part 11 of the frame 10 is formed with two female screw holes 11a and 11a, which open to an end face, which faces toward an outside, of the outer portion 15c of the accommodation hole 15 and into which the screw members 36 are screwed. In addition, the two screw members 36 and 36 are inserted into the respective screw insertion holes 82h of the flange portion 82g of the holder 82, and are screwed into the respective female screw holes 11a of the frame 10 (main body part 11).

According to the configuration, when the screw member 36 is tightened from the state where the head is in contact with the holder 82 (flange portion 82g), the axial force acts on the holder 82 in the pressing direction, and as a result, the similar effects to those of the example shown in FIG. 4 are obtained. Note that, in the case of this configuration, the reactive force at the time when the screw member 36 exerts the axial force on the holder 82 is received by the portion of the main body part 11 (female screw hole 11a) screwed with the screw member 36. Therefore, in this example, the portion of the main body part 11 of the frame 10, in which each female screw hole 11a is formed, corresponds to the base part. Further, in this example, a lid member 88 is attached to an end surface of the holder 82 in a form of closing the opening. Thereby, the opening of the accommodation hole 15 is closed by the flange portion 82g of the holder 82 and the lid member 88.

However, in the case of the configuration without a cylinder member, as in the examples of FIGS. 6 and 7, the position (rotation position) of the holder in the rotation direction that is changed (positioned) when the holder is rotated for backlash adjustment is limited to the positions of the screw member and the female screw hole into which the screw member is screwed. That is, in the examples of FIGS. 6 and 7, the rotation position is changed every angle range of 180°. Note that, by increasing the number of female screw holes or screw insertion holes, the restricted angle range can be reduced, but the restriction is still applied. In contrast, according to the configuration including the cylinder member, as in the above embodiment, the holder can take an arbitrary position without the restriction on the rotation position. Therefore, when it is necessary to more finely adjust the backlash, the configuration including the cylinder member is preferable.

(4) As for the axial force generation part, in the example described above, the axial force generation part is configured so that the screwing direction of the screw member coincides with the axis line direction. However, in the present invention, the axial force generation part is not limited to such a configuration, and may also be configured so that the screwing direction of the screw member coincides with the radial direction of the holder.

Figure 8:
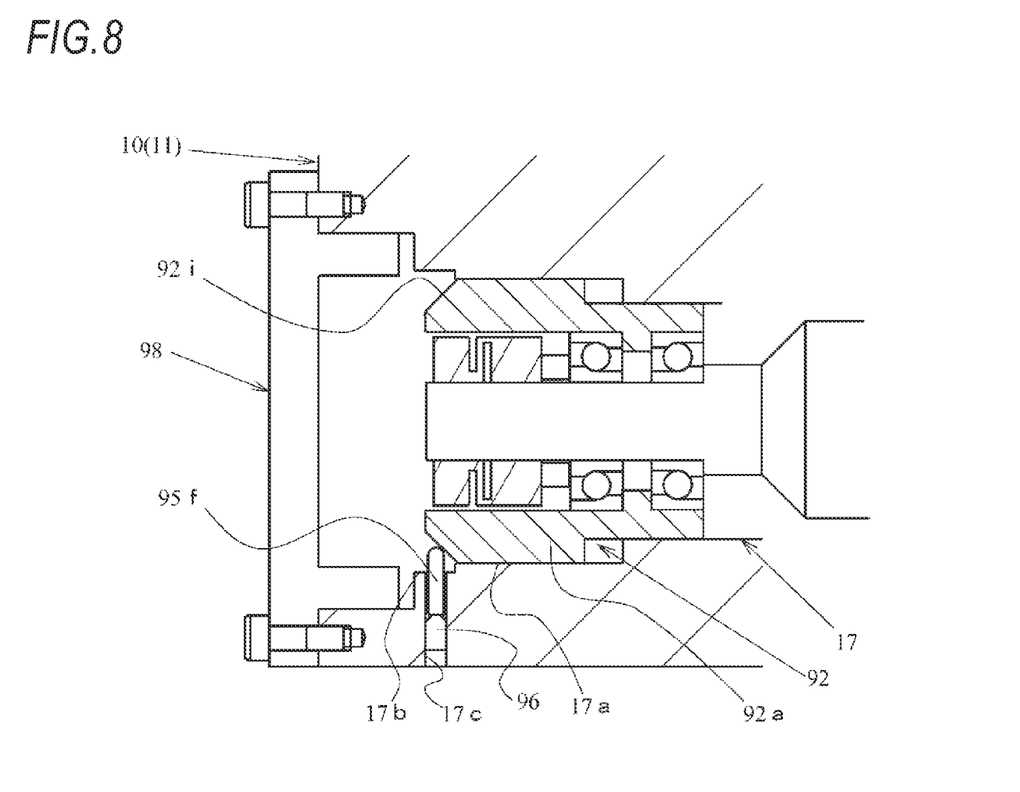
FIG. 8 is a partially cross-sectional plan view showing main parts in another embodiment of the mechanical device having the worm gear mechanism device according to the present invention.

Specifically, a configuration shown in FIG. 8 is considered as an example. In the configuration of FIG. 8, the cylinder member is not provided, as in the examples of FIG. 6 and the like, and a holder 92 is configured to have an inclined portion 92i formed in a tapered shape on a side closer to a lid member 98 than a large-diameter portion 92a on which a male screw is formed. Further, an arrangement portion of an accommodation hole 17 is formed as an outer arrangement portion 17b having a diameter slightly larger than that of a female screw portion 17a, on a side closer to the lid member 98 than the female screw portion 17a on which a female screw is formed. The holder 92 is arranged so that the inclined portion 92i positionally overlaps with the outer arrangement portion 17b of the arrangement portion of the accommodation hole 17 in the axis line direction.

In addition, the main body part 11 of the frame 10 is formed with a through-hole 17c drilled in the radial direction so as to open to an inner peripheral surface of the outer arrangement portion 17b of the accommodation hole 17. Note that, the through-hole 17c is a female screw hole whose inner peripheral surface is formed with a female screw. In addition, a set screw 96 as a screw member is screwed into the female screw hole 17c. Further, a pressing member 95f for exerting a radial force generated by the screwing action of the set screw 96 on the holder 92 is interposed between the set screw 96 and the holder 92 (inclined portion 92i). Note that, the pressing member 95f is a columnar member, and is formed so that an end portion on the holder 92-side forms a hemispherical shape.

According to the configuration, when the set screw 96 is tightened from the state where the pressing member 95f is in contact with the inclined portion 92i of the holder 92, the pressing member 95f interposed between the set screw 96 and the holder 92 exerts the radial force on the holder 92 by the screwing action. The radial force is received by the inclined portion 92i of the holder 92, so that a component force in the pressing direction acts on the holder 92 and the component force becomes the axial force in the pressing direction. Note that, in the case of this configuration, the reactive force at the time when the pressing member 95f exerts the axial force on the holder 92 is received by the screwed portion of the main body part 11 (male screw hole 17c) into which the set screw 96 is screwed. Therefore, in this example, the portion of the main body part 11 of the frame 10, in which the female screw hole 17c is formed, corresponds to the base part.

(5) As for the mechanical device having the worm gear mechanism to which the present invention is applied, in the example described above, the present invention is applied to the so-called horizontal rotary table device installed with the axis line of the rotary shaft facing in the vertical direction. However, the mechanical device to which the present invention is applied is not limited to such a rotary table device.

For example, as a working machine-related mechanical device, which is a mechanical device having a worm gear mechanism configured to adjust backlash by moving a worm shaft in an axis line direction, which is the preamble of the present invention, there is a so-called cradle type tilting table device, which includes a tilting table (cradle) constituted by a table on which a workpiece is placed and a pair of arm parts configured to support the table and in which an axis line of the arm part (rotary shaft) and a placement surface of the table on which the workpiece is placed are apart from each other. Therefore, the present invention can also be applied to such a tilting table device.

Further, the mechanical device to which the present invention is applied is not limited to the circular table device described above and the tilting table device, and may also be another working machine-related mechanical device as long as it has the worm gear mechanism configured as described above, and may also be another mechanical device without being limited to the working machine-related mechanical device.

The present invention is not limited to the above embodiment, and can be variously changed without departing from the gist of the present invention.

The invention claimed is:

1. A mechanical device having a worm gear mechanism including: a worm wheel attached to a rotary shaft; and a worm shaft including a worm in mesh with the worm wheel and provided in an accommodation hole of a frame, the worm gear mechanism configured to adjust backlash between the worm and the worm wheel by movement of the worm shaft in an axis line direction, the mechanical device including a position adjusting mechanism, the position adjusting mechanism comprising:
a holder screwed into the accommodation hole on one end-side of the accommodation hole, the holder configured to rotatably support the worm shaft, the holder configured to cause the movement of the worm shaft by rotation;
a base part provided to the frame such that a member, which is separate from the holder and the frame, is attached to the frame, or a base part provided to the frame such that the base part is formed as a part of the frame; and
an axial force generation part including a screw member, the axial force generation part configured to exert an axial force on the holder only in one direction of the axis line direction by a screwing action resulting from rotation of the screw member, the axial force is a force in the axis line direction,
wherein the position adjusting mechanism is configured such that the base part receives a reactive force acting on the axial force generation part as a result of exerting the axial force to the holder.

2. The mechanical device according to claim 1, wherein the position adjusting mechanism is configured so that a screwing direction of the screw member of the axial force generation part coincides with the axis line direction.

3. The mechanical device according to claim 2, wherein the position adjusting mechanism is configured so that the holder and the axial force generation part are engaged to each other so that the holder can take an arbitrary position in a direction in which the holder is rotated.

4. The mechanical device according to claim 3, wherein the axial force generation part includes:
a cylinder member including an engaging surface that is engaged to the holder, the engaging surface intersects the axis line direction, the engaging surface is present in a circumferential direction; and
the screw member configured to move the cylinder member in the axis line direction by the screwing action.

* * * * *